United States Patent
LaMarca et al.

(10) Patent No.: US 9,490,892 B2
(45) Date of Patent: Nov. 8, 2016

(54) FEATURE TRANSPARENCY FOR WIRELESS DEVICES

(71) Applicant: GOGO LLC, Chicago, IL (US)

(72) Inventors: Tony LaMarca, Loves Park, IL (US);
Kathy Wang, Buffalo Park, IL (US);
Michael Metz, Glenview, IL (US);
Ronald A. Wahler, Boulder, CO (US)

(73) Assignee: GOGO LLC, Chicago, IL (US)

( * ) Notice: Subject to any disclaimer, the term of this patent is extended or adjusted under 35 U.S.C. 154(b) by 0 days.

(21) Appl. No.: 14/912,834

(22) PCT Filed: Aug. 14, 2014

(86) PCT No.: PCT/US2014/051053
§ 371 (c)(1),
(2) Date: Feb. 18, 2016

(87) PCT Pub. No.: WO2015/026623
PCT Pub. Date: Feb. 26, 2015

(65) Prior Publication Data
US 2016/0226574 A1     Aug. 4, 2016

Related U.S. Application Data

(60) Provisional application No. 61/901,608, filed on Nov. 8, 2013, provisional application No. 61/868,416, filed on Aug. 21, 2013.

(51) Int. Cl.
*H04W 4/00* (2009.01)
*H04B 7/185* (2006.01)
*H04W 84/00* (2009.01)

(52) U.S. Cl.
CPC ...... *H04B 7/18506* (2013.01); *H04B 7/18508* (2013.01); *H04W 84/005* (2013.01)

(58) Field of Classification Search
CPC ....................................................... H04B 7/15
USPC ............ 455/422.1, 427, 428, 429, 430, 11.1, 455/12.1; 370/316, 329, 338, 389
See application file for complete search history.

(56) References Cited

U.S. PATENT DOCUMENTS

| | | |
|---|---|---|
| 6,735,438 B1 | 5/2004 | Sabatino |
| 2004/0142658 A1 | 7/2004 | McKenna et al. |
| 2008/0141314 A1 | 6/2008 | Lemond et al. |

OTHER PUBLICATIONS

International Search Report and Written Opinion for corresponding International Application No. PCT/US2014/051053, dated Oct. 21, 2014.
Second Written Opinion for corresponding International Application No. PCT/US2014/051053, dated Jul. 13, 2015.
International Preliminary Report on Patentability for corresponding International Application No. PCT/US2014/051053, dated Nov. 13, 2015.

*Primary Examiner* — Nathan Mitchell
*Assistant Examiner* — Sayed T Zewari
(74) *Attorney, Agent, or Firm* — Marshall, Gerstein & Borun LLP; Randall G. Rueth

(57) ABSTRACT

A sentry engine determines, based on current conditions and a set of rules, whether or not to allow a feature, that is provided in a terrestrial environment to the wireless device, to be provided to the wireless device on-board a vehicle in a non-terrestrial environment. The sentry engine may be disposed in the wireless device, in an on-board data delivery device fixedly connected to the vehicle, and/or at a ground network in communication with the on-board data delivery device and the home network of the wireless device. The on-board data delivery device may communicate with the wireless device via an on-board local network, and may communicate with the ground network using a satellite network and/or an air-to-ground network. Allowance conditions may include operational and/or connectional states of devices and/or networks, a vehicle state, a roaming or authorization state of the wireless device, or a state of the feature.

20 Claims, 9 Drawing Sheets

FEATURE TRANSPARENCY FOR WIRELESS DEVICES

RELATED APPLICATIONS

This is a Patent Cooperation Treaty (PCT) application that claims priority to and the benefit of the filing date of U.S. Provisional Patent Application No. 61/868,416 entitled "Feature Transparency for Wireless Devices" and filed on Aug. 21, 2013, and that claims priority to and the benefit of the filing date of U.S. Provisional Patent Application No. 61/901,608 entitled "Feature Transparency for Wireless Devices" and filed on Nov. 8, 2013, the entire disclosures of which are incorporated by reference herein in their entireties for all purposes.

FIELD AND BACKGROUND OF THE DISCLOSURE

1. Technical Field

The instant disclosure generally relates to non-terrestrial communications and, in particular, to systems, methods and techniques of seamlessly providing, in non-terrestrial environments, features that are available to wireless or mobile devices in terrestrial environments.

2. Background

Currently, existing airlines and other transportation companies provide communication services to mobile or wireless devices (e.g., cellular phones, smart devices, laptops, tablet computers, etc.) when such devices are on-board a vehicle while the vehicle is in en route to a destination. However, the delivery of terrestrial or native features (e.g., roaming, texting, simultaneous calls, etc.) to mobile or wireless devices while a vehicle is in transit presents difficulties. Typically, to support native, terrestrial features at a mobile or wireless device in a non-terrestrial environment, cellular base stations such as "picocells" are installed on-board the vehicle, and the mobile device connects, via the cellular radio of the mobile device and the on-board cellular base stations, to an on-board network. In some cases, hardware in addition to the cellular base stations is also installed on-board the vehicle. This extraneous infrastructure is both limiting and extremely expensive. Moreover, the radio transmissions produced on-board the vehicle may interfere with ground-based cellular systems. For example, if mobile devices on-board the vehicle cannot find an adequate cellular band to which they may connect (e.g., when on-board cellular base stations are deactivated), the mobile devices will automatically increase their power, which may interfere with ground-based terrestrial cell sites as well as quickly drain the batteries of the mobile devices.

Some existing terrestrial communications systems are able provide features that are native to a mobile device's home system while the mobile device is connected to a terrestrial Wi-Fi (Wireless Fidelity) network having base stations that are fixedly in connection with the ground. Such Wi-Fi roaming and feature provisions, though, may be limited in a non-terrestrial environment, e.g., while an aircraft is in flight. For example, as an aircraft goes through flight states such as taxi, take-off, climbing, cruising altitude, descent and landing, the regulations for use of radio frequency transmissions vary, which affect the ability to seamlessly provide native or terrestrial features at the mobile device. In addition, the availability of a connection to a ground-based network may vary as the vehicle travels, which may also affect the ability to provide native or terrestrial features at the mobile device.

DETAILED DESCRIPTION OF THE PREFERRED EMBODIMENTS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning Finally, unless a claim element is defined by reciting the word "means" and a function without the recital of any structure, it is not intended that the scope of any claim element be interpreted based on the application of 35 U.S.C. §112, sixth paragraph.

Any or all of the contents of the present disclosure may operate in conjunction with any or all of the contents of the disclosure of co-pending U.S. patent application Ser. No. 13/675,194 entitled "COMMUNICATION SYSTEM AND METHOD FOR NODES ASSOCIATED WITH A VEHICLE" and filed on Nov. 13, 2012, the contents of which are hereby incorporated by reference in their entirety. Additionally or alternatively, any or all of the contents of the present disclosure may operate in conjunction with any or all of the contents of the disclosure of co-pending U.S. patent application Ser. No. 13/675,200 entitled "VEHICLE DATA DISTRIBUTION SYSTEM AND METHOD" and filed on Nov. 13, 2012, the contents of which are hereby incorporated by reference in their entirety. Additionally or alternatively, any or all of the contents of the present disclosure may operate in conjunction with any or all of the contents of the disclosure of co-pending U.S. patent application Ser. No. 13/675,190 entitled "GROUND SYSTEM FOR VEHICLE DATA DISTRIBUTION" and filed on Nov. 13, 2012, the contents of which are hereby incorporated by reference in their entirety.

Figure 1A:
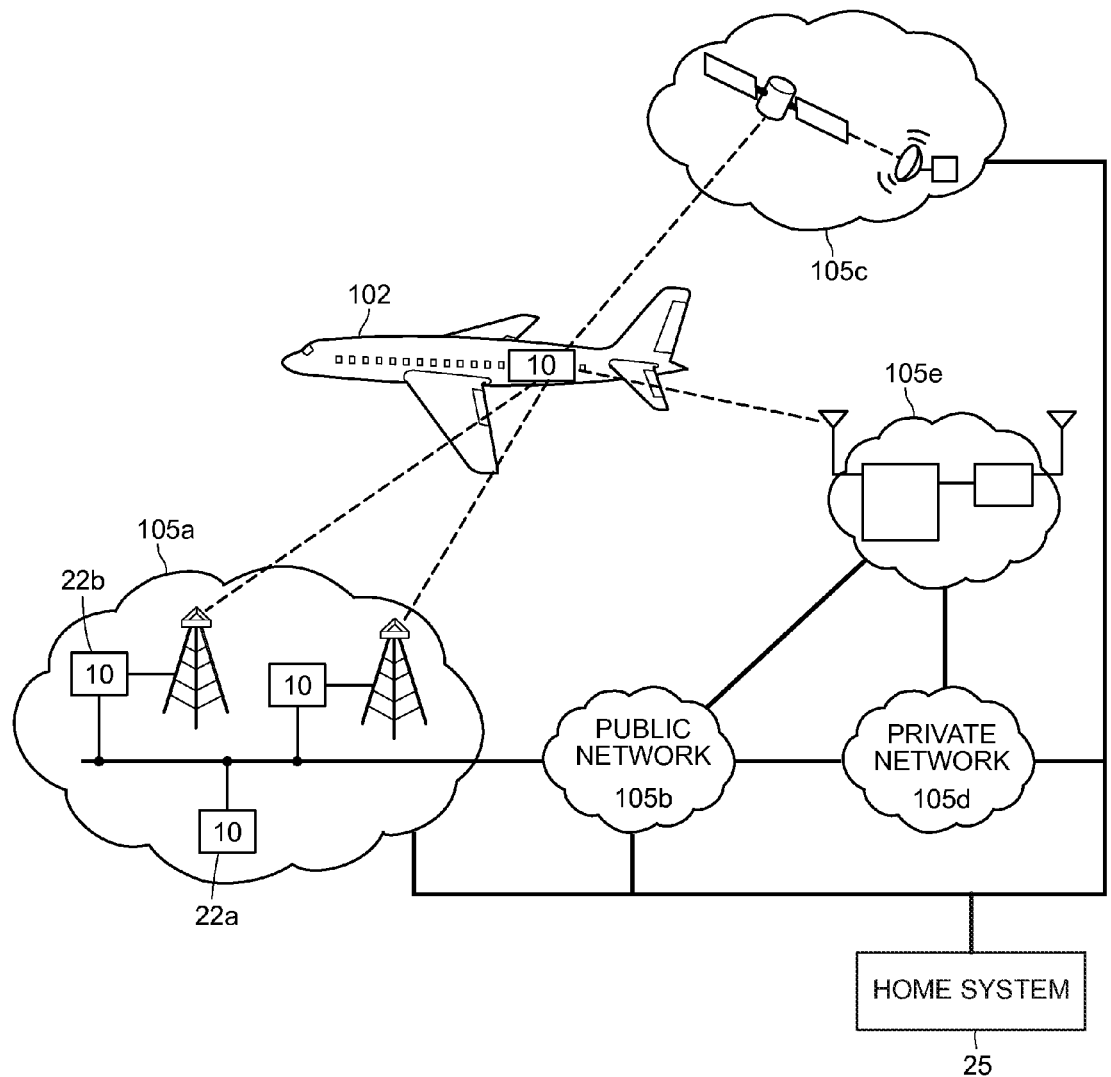
FIG. 1A illustrates an exemplary system providing feature transparency at wireless or mobile devices in non-terrestrial environments.

FIG. 1A illustrates an example feature transparency system 10 for providing feature transparency for wireless or mobile devices. "Feature transparency," as used herein, generally refers to providing features, that are native to or provided at wireless devices in a terrestrial environment (e.g., while the wireless devices are being serviced by cell sites or wireless access points that are connected to a structure that is physically and fixedly connected to the ground), to the wireless devices when the wireless devices are in a non-terrestrial environment, (e.g., while the wireless devices are being serviced by wireless access points that are connected to a structure that is fixedly connected to a vehicle), such as while the wireless or mobile device is being transported by an aircraft in flight or by a sailing boat. Examples of wireless devices or mobile devices may include cell phones, smartphones or smart devices, laptops, tablet computers, electronic readers, or any other portable, wireless computing or communications device. Examples of native or terrestrial features may include basic call delivery, roaming, texting, supporting simultaneous multiple calls, or any other feature that typically requires a wireless or mobile device to communicate with its home system in order to provide the feature at the device.

As shown in the embodiment illustrated in FIG. 1A, portions of the feature transparency system 10 may be distributed or included across various nodes and networks. For example, an instance of the feature transparency system 10 may be included in a vehicle 102 or at a ground-based network or system 105a. An example of a of ground-based system 105a in which the feature transparency system 10 may be included may be found in aforementioned co-pending U.S. patent application Ser. No. 13/675,190 entitled "GROUND SYSTEM FOR VEHICLE DATA DISTRIBUTION," although the feature transparency system 10 may be included in any suitable ground-based system or network.

Figure 1B:
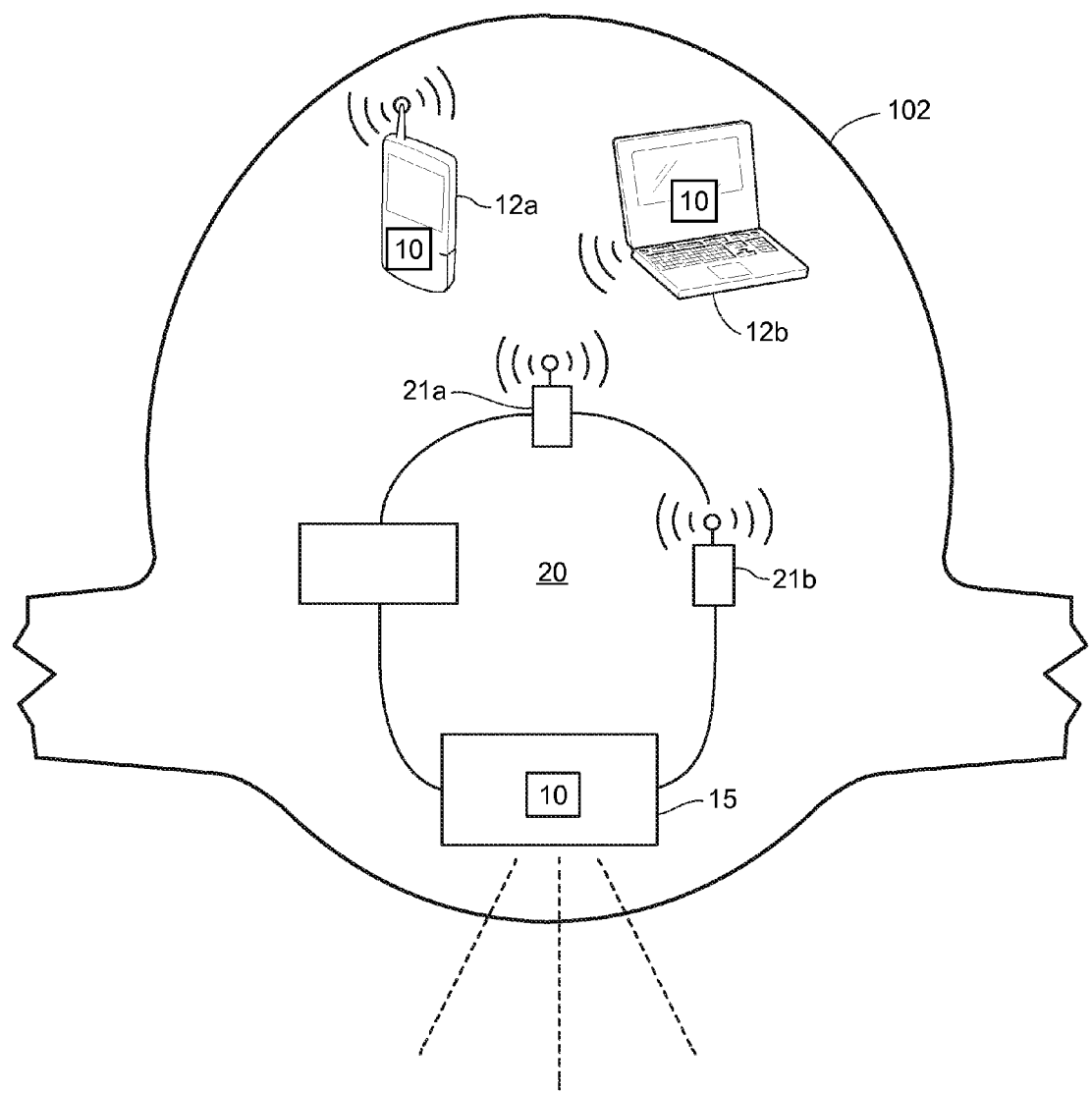
FIG. 1B illustrates instances of the feature transparency system being included in a detailed, cross-sectional view of the vehicle shown in FIGS. 1A and 1$n$ wireless devices being transported by the vehicle.

FIG. 1B provides a detailed, cross-sectional view of the vehicle 102 of FIG. 1, including the respective portion or instance of the feature transparency system 10 included therein, as well as illustrations of the devices 12a, 12b that are being transported by the vehicle 102 and that each include a respective portion or instance of the feature transparency system 10. For example, a wireless device 12a or 12b may include at least a portion or instance of the feature transparency system 10, and/or a node or computing device 15 that is fixedly connected to the vehicle 102 (e.g., so that the node 15 is transported along with the vehicle 102 as the vehicle 102 travels) may include at least a portion or instance of the feature transparency system 10. In an embodiment, the node 15 is a node of an on-board communications network 20 to which wireless devices 12a, 12b may directly communicate or directly connect, e.g., by accessing a wireless access point 21a, 21b. In an embodiment, the on-board network 20 includes a Wi-Fi network that is hosted on and wholly contained within the vehicle 102. In an embodiment, more than one on-board network 20 is contained within the vehicle 102. For example, in addition to the Wi-Fi network, a Worldwide Interoperability for Microwave Access (WiMAX) network, an on-board ARINC network, a wired Ethernet network, and/or other local networks 20 may be contained within the vehicle 102.

Returning to FIG. 1A, in an embodiment, a node or computing device 22a, 22b of a ground-based system 105a may include at least a portion or instance of the feature transparency system 10. The ground-based system 105a may be configured to communicate with the on-board communications network 20 of the vehicle 102, for example, by using an air-to-ground (ATG) communication channel.

Referring simultaneously to FIGS. 1A and 1B, generally, to support communications between the wireless or mobile device 12 and a terrestrial location, a node 15 of the on-board communications network 20 may be configured to distribute data or information onto the vehicle 102, from the vehicle 102, or both onto and from a vehicle 102. For clarity, the node 15 is generally referred to interchangeably herein as an "on-board information distribution device, "information distribution device," "data distribution device," or "data distribution node." In an embodiment, the data distribution node 15 may be similar to the on-board information distribution device described in aforementioned co-pending U.S. patent application Ser. No. 13/675,200 entitled "VEHICLE DATA DISTRIBUTION SYSTEM AND METHOD."

At any given moment in time, the data distribution node 15 may be in communicative connection with one or more networks 105a-105e that are disposed, managed, and/or hosted, for the most part (if not entirely), externally to the vehicle. As such, the networks 105a-105e are referred to herein as "external networks," and may be data networks, communication networks, or a combination of data and communication networks. Some of the networks 105a-105e may be ground-based or terrestrial networks. For example, the external network 105b may be a public, ground-based data or communications network, such as the Internet and/or the PSTN (Public Switched Telephone Network). The external network 105d may be a ground-based private data and/or communications network. Generally, as referred to herein, a "ground," "ground-based," or "terrestrial" network or computing device refers to networks and computing devices whose infrastructure is not being transported by the vehicle 102 or is essentially stationary on or near the surface of the earth. Typically, ground systems and ground computing devices may be essentially fixed in location, and base stations or infrastructure containing equipment via which devices may wirelessly access the ground system may be contained in one or more buildings or other structures that are fixedly attached to the ground or to earth, or that are located in an essentially terrestrial location, such as a barge anchored in a body of water.

The external network 105e may be another example of a ground-based local network (e.g., a terrestrial Wi-Fi based public or private network) that is located or hosted at a destination or origination point of the vehicle 102, or at a respective port, terminal, station or way station, dock, bay, garage, vehicle maintenance location, or other location at which the vehicle 102 may be fixedly stationed for a temporary amount of time. Such locations, for clarity, are referred to herein as a "port." Generally, a port may be a designated location from which vehicles may depart and at which vehicles may arrive. Examples of ports may include airports, shipping ports, railroad stations, hospitals, shipping terminals, bus terminals, fueling stations, vehicle maintenance or service areas, military bases, ports or aircraft carriers, and the like.

On the other hand, one or more of the external networks 105a-105e may be non-terrestrial, e.g., may have infrastructure that is supported by a non-terrestrial structure such as an aircraft or other non-terrestrial vehicle, a satellite, the space station, or other suitable non-terrestrial structure. One example of a non-terrestrial, external network 105c may be a satellite network. The satellite network 105c may utilize any satellite communications band, e.g., the L-band, the $K_a$ band, the $K_u$ band, or any other frequency band allocated for satellite communications. In an embodiment, multiple satellite communications networks 105c utilizing different satellite communications bands may support the feature transparency system 10. The satellite network 105c may be in communicative connection with one or more networks, such as an air-to-ground (ATG) network 105a (which is described in more detail below), the public network 105b, and/or a private network 105d.

Further, in some scenarios, one or more of the non-terrestrial, external networks may be a combination of communicatively connected ground-based and air-borne networks, such as an air-to-ground (ATG) communication network 105a whose spectrum is allocated for direct communications between aircraft and ground based stations, e.g., 849-851 MHz and 894-896 MHz. The ATG network 105a may be in communicative connection with one or more ground-based networks, such as a local ground-based network 105e, a public network 105b, and/or a private network 105d.

Thus, in view of the above discussion, the feature transparency system 10 may be supported by a non-terrestrial network having a plurality of portions, in some implementations. For example, when the vehicle is disposed in a non-terrestrial environment or is airborne, the feature transparency system 10 may be supported by a non-terrestrial network having an on-board portion that is contained within the vehicle 102 (e.g., an on-board Wi-Fi communications network 20) and having one or more portions that are external to the vehicle in the non-terrestrial environment (e.g., the ATG network 105a and/or one or more satellite communications networks 105c such as an L-band, $K_a$ band and/or $K_u$ band-compatible satellite network).

Typically, the on-board network 20 may be communicatively connected to the external terrestrial networks and non-terrestrial networks 105a-105e using at least a wireless connection or communication link, but for some external networks at certain instances in time, the on-board network 20 may include a wired connection to an external network, such as when the vehicle 102 is parked at a port.

Each of the external networks 105a-105e may be a privately managed network, a public network, or some combination of one or more private and public networks. An external network 105a-105e may utilize any known communication protocol or combinations thereof, such as a standards-based wireless protocol, a standards-based wired protocol, a private wired protocol, or a private wireless protocol. For example, an external network may utilize the messaging protocol described in aforementioned U.S. patent application Ser. No. 13/675,194 entitled "COMMUNICATION SYSTEM AND METHOD FOR NODES ASSOCIATED WITH A VEHICLE." Some or all of the external networks 105a-105e may be connected to other external networks 105a-105e. For example, a private network 105e at an airport may be communicatively connected to nationwide private, ground-based data distribution network 105d for avionics information, which may in turn be connected to the Internet 105b.

Additionally, although FIG. 1A illustrates five external networks 105a-105e, the techniques and principles described herein equally apply to on-board communication networks 20 that are in communicative connection to other numbers of external networks, such as one external network, two external networks, more than six external networks, or any other suitable number of external networks. The on-board communication network 20, via one or more of the external networks 105a-105e, may allow communications between a wireless device 12a, 12b and a home network or system 25 of the wireless device.

Typically, the home network or system 22 of the wireless device 12a, 12b may be administered or provided by a cellular communications service provider (e.g., a terrestrial wireless service communications provider) with which an owner/user of the wireless device 12a, 12b has an agreement to receive wireless communications services and features. Accordingly, the home system 25 of the wireless device 12a, 12b may administrate (or may be in connection with a system that administrates) a Home Location Register (HLR) and/or a Visiting Location Register (VLR), among other information, to support roaming and other features for the wireless device 12a, 12b. Additionally, the cellular radio frequency (RF) communications band utilized by the home system 25 to wirelessly and directly communicate with mobile devices may be an RF band designated for AMPs, TDMA, CDMA, GSM, PCS, 3G, 4G, 5G, and/or any other known terrestrial cellular radio frequency band. Generally, a cellular radio frequency band is a portion of RF spectrum that is allocated by a governmental agency or other body which governs the usage of spectrum. In some systems 25, more than one cellular RF band may be supported.

Turning to the vehicle 102, the vehicle 102 may be owned and/or operated by an individual, or the vehicle may be owned and/or operated by a company, organization or governmental entity. The vehicle may be one of a fleet of vehicles. The vehicle 102 may be used to transport passengers who pay for or otherwise are granted passage on the vehicle. The vehicle 102 may be used to transport executives or staff of a company or organization and their guests. The vehicle 102 may be used to transport live or inanimate cargo, packages, mail, and/or other types of passengers or cargo. Furthermore, although FIG. 1A depicts the vehicle 102 as an aircraft, the techniques and principles described herein equally apply to other types of vehicles such as trucks, automobiles, busses, trains, boats, ships, barges, subway cars, helicopters, ambulances or other emergency vehicles, military vehicles, other air-borne, water-borne, or land-borne vehicles, and vehicles that are suitable for space travel.

Figure 2:
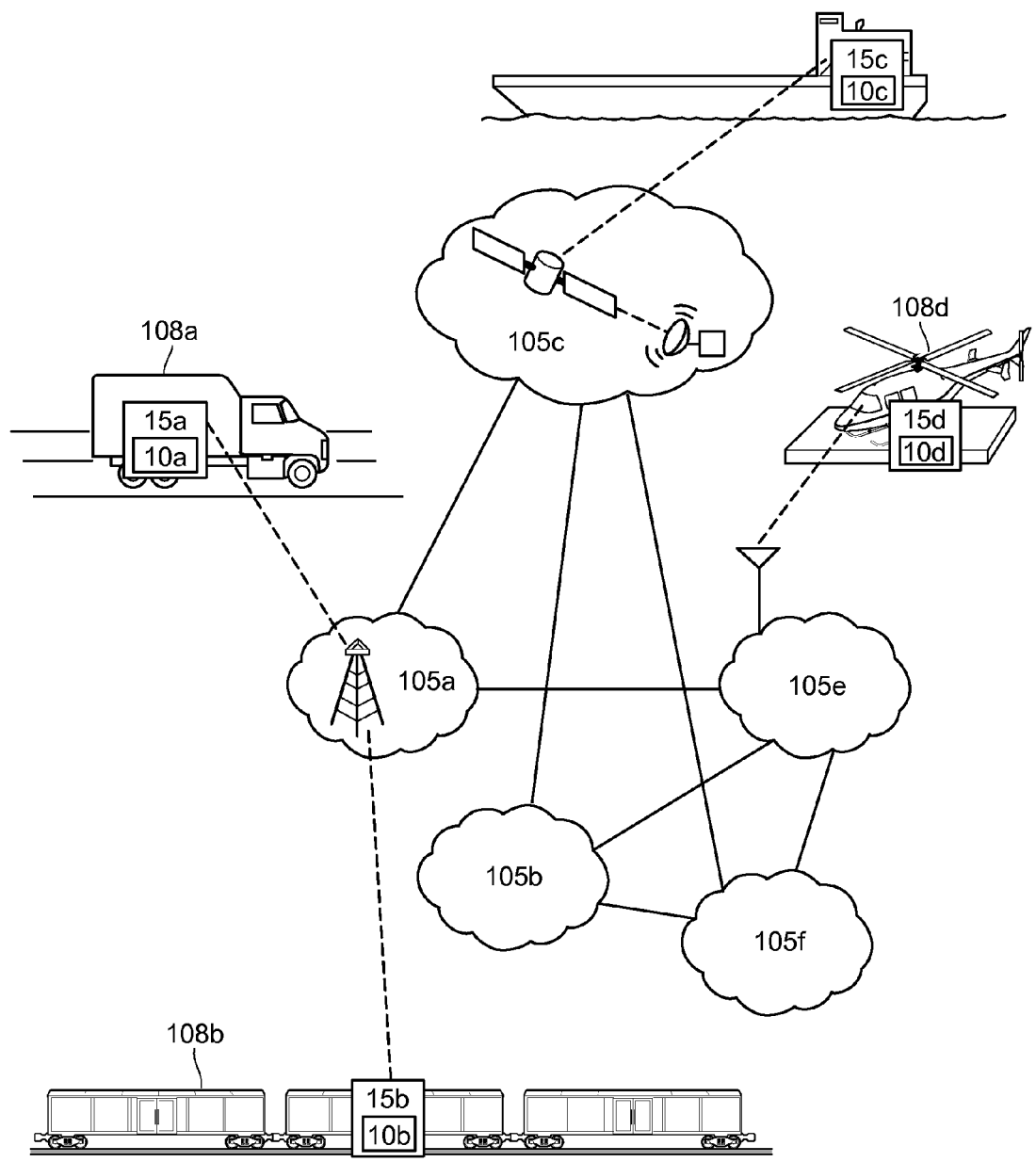
FIG. 2 illustrates examples of various types of vehicles, each of which may be compatible with the feature transparency system of FIG. 1.

FIG. 2 illustrates examples of various types of vehicles 108a-108d, each of which may be compatible with the feature transparency system 10 of FIG. 1A. For example, each of the vehicles 108a-108d may include a respective instance or at least a portion of the feature transparency system 10 (denoted in FIG. 2 by references 10a-10d). Additionally, to support communications of wireless devices on-board each vehicle, each vehicle 108a-108d may include a respective node 15a-15d in communicative connection with at least one of the one or more external networks 105a-105f, as denoted by the dashed lines. At any given time, a particular instance of the node 15a-15d on a particular vehicle may be in communicative connection with a different set or subset of the external networks 105a-105e than is another instance of the node 15a-15d on another vehicle.

Figure 3:
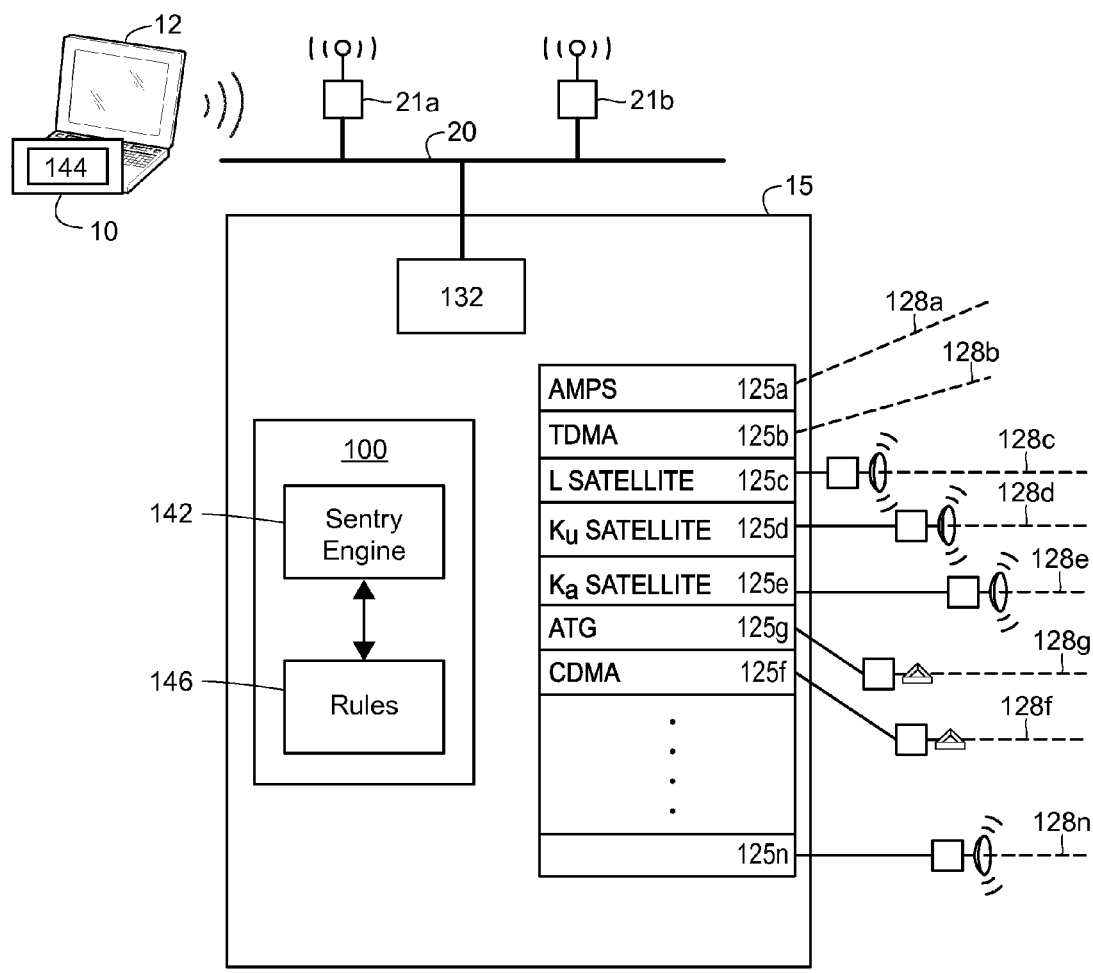
FIG. 3 illustrates a simplified block diagram of an embodiment of the feature transparency system of FIG. 1.

FIG. 3 illustrates a simplified block diagram of an embodiment 100 of the feature transparency system 10 of FIG. 1. In this embodiment, the system 100 is shown as being included on the on-board data distribution device 15 of the vehicle 102, and is discussed with simultaneous reference to FIGS. 1 and 2. It is understood, however, that any of the techniques or portions discussed with respect to FIG. 3 are equally applicable to instances or portions of the feature transparency system disposed at other nodes, such as at another node of the on-board communications network 20, at a ground-based node 22, or at a mobile or wireless device 12a, 12b. Additionally, any of the techniques or portions discussed with respect to FIG. 3 are equally applicable to other vehicles and/or other non-terrestrial communications systems.

The on-board data distribution device 15 may include one or more interfaces 125a-125n corresponding to one or more bearers 128a-128n. The interfaces 125a-125n are referred to herein as "external interfaces," as they enable data to be delivered onto and off of the vehicle 102. In an embodiment, each external interface 125a-125n may correspond to a respective bearer 128a-128n. Additionally, each external interface 125a-125n may be configured to allow data to be transmitted from the vehicle 102 over the respective bearer 128a-128n, and/or to allow data to be received onto the vehicle 102 from the respective bearer 128a-128n. A "bearer" or "data bearer," as used interchangeably herein, generally refers to one or more communication channels that are designated to support a particular communication standard for transmitting and/or receiving information or data. A bearer may use wireless or wired technology, and the one or more bearers 128a-128n may be of different types. Examples of bearer types may include satellite communication or data bearers, such as satellites that use the L, $K_u$ or $K_a$ band (denoted by references 128c, 128d, and 128e respectively) or other satellite communications bands; satellites that are owned and operated by companies or organizations (e.g., Iridium Communications Inc., Inmarsat, SBB (SwiftBroadBand), and/or others), high-speed Internet satellites, and other satellite communications or data transport technologies. Other examples of bearer types include cellular or mobile communication systems that use terrestrial modems, e.g., AMPS (Advanced Mobile Phone System, denoted by reference 128a), TDMA (Time Division Multiple Access, denoted by reference 128b), GSM (Global System for Mobile Communications), CDMA (Code Division Multiple Access, denoted by reference 1280, LTE (Long Term Evolution), and/or other mobile communications technologies. Other types of bearers may include air-to-ground (ATG) communication systems (reference 128g).

Each external interface 125a-125n may be communicatively connected to a respective transmission medium corresponding to the bearer 128a-128n, and each external interface 125a-125n may be configured to receive data onto the vehicle 102 over the respective transmission medium and to cause data to be transmitted from the vehicle 102 over the respective transmission medium. For example, an AMPs external interface 125a may be connected to one or more AMPs compatible transceivers and antennas to send and receive data in an AMPs-designated frequency band 128a. In another example, an air-to-ground external interface 125g may be connected to one or more EVDO (Evolution Data Optimized) compatible transceivers and antennas to send and receive data over channels reserved for air-to-ground communications 128g, e.g., 849-851 MHz and 894-896 MHz. In yet another example, a first satellite external interface 125d may be connected to one or more suitable transceivers and antennas to send and receive data over the $K_u$ band 128d (e.g., 12-18 GHz), and a second satellite external interface 125e may be connected to one or more suitable transceivers and antennas to send and receive data over the $K_a$ band 128e (e.g., 26.5-40 GHz).

The data distribution device 15 may include an interface 132 to communicatively connect to the on-board communications network 20. The on-board network 20 may be disposed, managed, and/or hosted entirely on-board the vehicle 102. For example, the on-board network 20 may be a Wi-Fi network that is contained and operates within the cabin of the vehicle 102. The on-board network 20 may utilize any known communication protocol or combinations thereof, such as a wireless protocol, a wired protocol, other ARINC standard-compatible protocols, or a private protocol. In an example, the on-board network 20 utilizes the messaging protocol described in aforementioned co-pending U.S. patent application Ser. No. 13/675,194 entitled "COMMUNICATION SYSTEM AND METHOD FOR NODES ASSOCIATED WITH A VEHICLE" and an IEEE 802.11 compatible protocol to communicate with the wireless device 12. In another example, the on-board network 20 utilizes a hypertext transfer protocol (HTTP) and a Near Field Communications (NFC)-compatible protocol (e.g., Bluetooth®), an IEEE 802.11 compatible protocol (e.g., Wi-Fi), or an IEEE 802.16-compatible protocol (e.g., WiMAX) to directly communicate with the wireless device 12.

Typically, though, the on-board network 20 does not communicate with on-board wireless devices 12 using any cellular band frequency communications protocol. That is, the on-board network 20 may not directly communicate with on-board wireless devices 12 using any AMPs, TDMA, CDMA, GSM, PCS, 3G, 4G, or 5G protocol. Indeed, the on-board network 20 may exclude or disable any cellular system-compatible base station technology (e.g., cellular base stations, small cells such as picocells, microcells, or femtocells, etc.) that operates in a terrestrial cellular frequency band. The on-board network 20, however, may include one or more access points 21a, 21b that utilize frequencies or frequency bands other than cellular RF bands via which mobile and wireless devices may access the network 20.

Thus, as described above, the on-board information distribution device 15 may be configured to receive, using the external interfaces 125a-125n, information onto the vehicle 102 from one or more external networks 105a-105e and/or the home systems 25 of wireless or mobile devices 12, and may be configured to cause the received information to be delivered to the appropriate wireless destination device 12 that is on-board the vehicle 102 using the on-board network 20. Additionally or alternatively, the on-board information distribution device 15 may be configured to transmit, from the vehicle 102 to one or more external networks 105a-105e and/or to the home system 25, information generated by an originating wireless device 12a, 12b that is on-board the vehicle 102.

Referring still to FIG. 3, the on-board information distribution device 15 may include an instance or at least a portion of the feature transparency system 10, which is indicated in FIG. 3 by reference 100. The feature transparency system 100 may include a sentry engine 142, for example. In an embodiment, the sentry engine 142 comprises a set of computer-executable instructions that are stored on one or more tangible, non-transitory computer-readable storage media such as a memory, one or more memory devices, one or more data storage devices, and the like. The computer-executable instructions of the sentry engine 142 may be executable by one or more processors, and the one or more processors may be included in the on-board information distribution device 15, in an embodiment. The one or more tangible computer-readable storage media on which the sentry engine 142 is stored may or may not be included in the on-board information distribution device 15, however, the one or more tangible computer-readable storage media may be accessible to a processor included in the on-board information distribution device 15. In an embodiment, the sentry engine 142 is included in a computing device, and the computing device is included in the on-board information distribution device 15.

The sentry engine 142 may be configured to allow or prevent communications between: (i) the home system 25 to which an onboard wireless device 12 is homed; and (ii) an application 144 executing on the wireless device 12, where the application 144 provides, at the wireless device 12, one or more features (e.g., text messaging, roaming, simultaneous phone calls, etc.) that are native to a terrestrial environment. For example, the home system 25 may include a cellular or mobile network and corresponding infrastructure which provides roaming, text messaging and phone call features while the wireless device 12 is being serviced in a terrestrial environment, and the application 144 may correspond to one or more of those terrestrial features.

One or more features (e.g., features that are terrestrially provided, e.g., by the device's home service provider) may be provided at a wireless device 12 by an application 144 executing on the wireless device. The application 144 may, for example, be a special-purpose application available at an online application store disposed at a ground based server of the home system 25 (not shown) or another application server (not shown). In an embodiment, the application 144 is designed for operating in a terrestrial environment, but is agnostic of whether or not the host wireless device 12 is currently in a terrestrial environment or in a non-terrestrial environment. The application 144 and an instance of the feature transparency system 10 that is loaded onto the device 12 may be separate and distinct, or the application 144 may be included in an instance of the feature transparency system 10 loaded onto the wireless device 12.

A single application (e.g., the application 144) may correspond to providing a single feature, and/or a single application (e.g., the application 144 or another application) may correspond to providing multiple features. For example, an application may allow the device 12 to roam in terrestrial cellular networks other than the device's 12 home network 25. Another application may allow the device 12 to access a particular web server.

To facilitate the provision of such features at the wireless device 12 in a non-terrestrial environment, the sentry engine 142 may determine states of various nodes, features, call states, and/or infrastructure components that are required to support the feature in a non-terrestrial environment. Such states may pertain to, for example, operations and/or components of the wireless device 12; authorizations, registrations and/or payment for features; connections to various networks disposed between the wireless device 12 and its home network 25; transportation or travel (e.g., flight) states of the vehicle 102; and/or communications infrastructure or components, for example. The sentry engine 142 may allow or prevent communication between the wireless device 12 and its corresponding home system 25 based on a set of rules 146 indicating the allowability or prohibition of a particular feature in a non-terrestrial environment based on a particular set of current states. In an embodiment, the rules 146 may be stored on a tangible, non-transitory computer-readable storage medium (e.g., a memory, one or more memory devices, a data storage device, etc.) that is on-board the vehicle 102. In the embodiment shown in FIG. 3, the rules 146 are included in the feature transparency system 100, although this is not necessary.

A set of rules (e.g., the rules 146) may pertain to a single feature, and/or a set of rules (e.g., the rules 146 or another set of rules) may pertain to multiple features, with different subsets of the rules 146 pertaining to different features. For example, the set of rules corresponding to the allowance or prevention of a feature from being provided in a non-terrestrial environment may include a first subset of rules corresponding to a first feature, and a second subset of rules corresponding to a second feature. The subset of rules included in the first portion may or may not intersect with the subset of rules included in the second portion. For example, rules pertaining to particular feature registration, authorization or activation may be mutually exclusive across the first and second subsets, while rules pertaining to an available air-to-ground connection may be included in both subsets.

Figure 4:
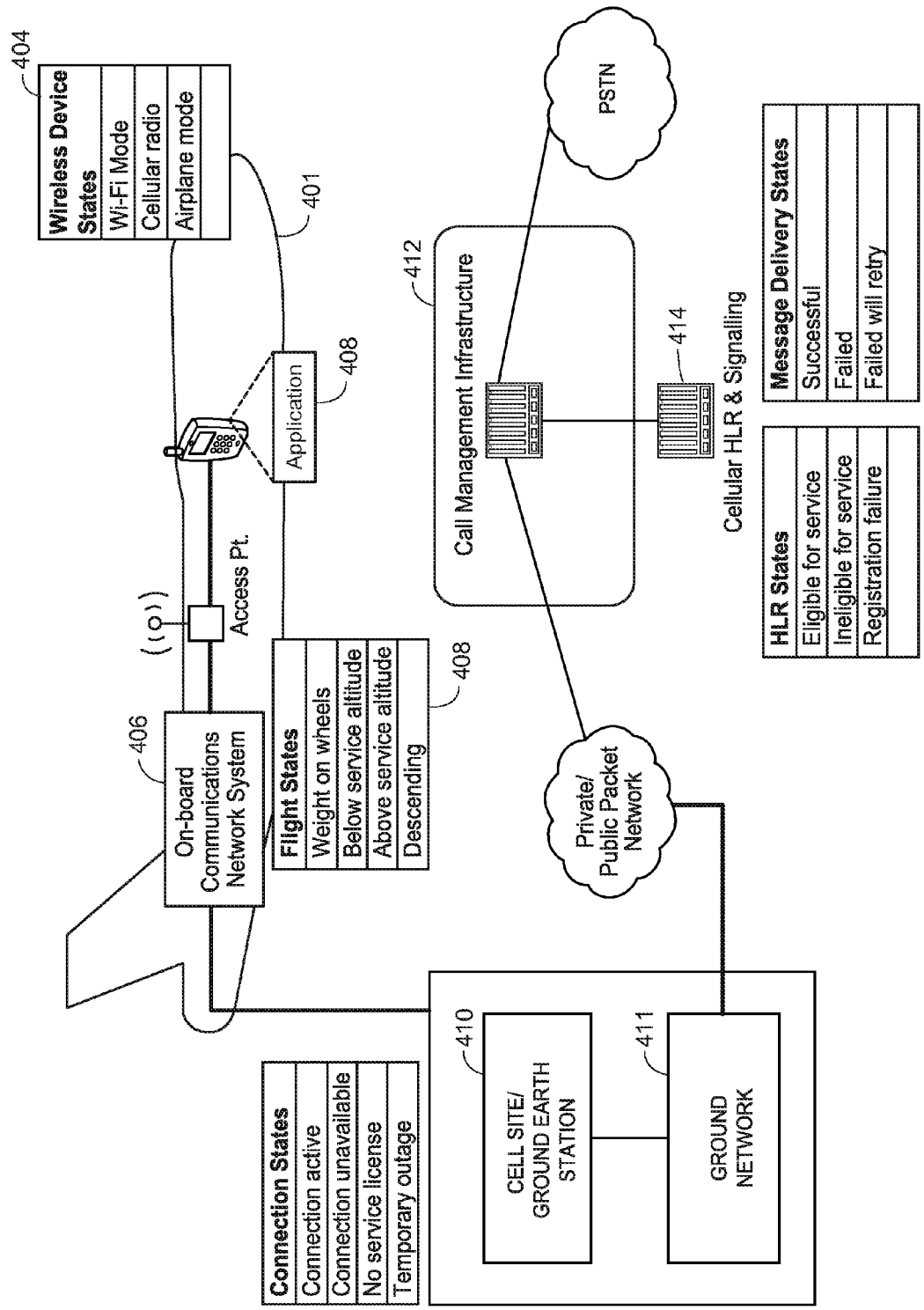
FIG. 4 illustrates example current conditions or states which may affect providing feature transparency at a wireless or mobile device in a non-terrestrial environment.

By way of example and without limitation, FIG. 4 illustrates various example conditions or states which may be reflected in the rules 146. A smartphone 400, which may execute the application 144, may be in a non-terrestrial environment (e.g., is being transported by an aircraft 401 in flight). Example wireless device states 404 of the smartphone 400 (or any wireless device 12, for that matter) may include (i) a "Wi-Fi mode" state in which the smartphone 400 may only communicate via a Wi-Fi connection; (ii) a "cellular radio" state in which the smartphone 400 may communicate via a cellular radio connection and possibly also in a simultaneous Wi-Fi connection; (iii) an "airplane mode" state in which the smartphone 400 may not communicate via any wireless connection; (iv) whether or not the wireless device 400 has been registered or otherwise authorized to provide one or more features (in a terrestrial environment, in a non-terrestrial environment, or in both environments); or other suitable wireless device states. Current states pertaining to the smartphone 400 may be determined and stored at the smartphone 400, in an embodiment.

In another example, an on-board communications network system 406 (e.g., the on-board communications system 20) disposed in the aircraft 401 may determine one or more example travel or flight states 408 of the vehicle 102 such as: (i) a "weight on wheels" state (e.g., when the aircraft 401 is on the ground but has departed a gate or port); (ii) a "below service altitude" state when the aircraft 401 is below a threshold altitude (e.g., 10,000 feet); (iii) an "above service altitude" state when the aircraft 401 is above the threshold altitude; (iv) a "descending" state when the aircraft 401 is descending to a destination port; (v) a "parked" state when the aircraft is parked at a gate or port; or other suitable transportation or travel states corresponding to the vehicle 102.

Further, various example ground based nodes and/or infrastructure components, such as a terrestrial cell sites 410, ground-based networks 411, and/or external networks 105a-

105e may have a variety of states or conditions corresponding respectively thereto. For example, a ground based node 22 of a ground-based network 411 may determine and store states such as "connection to network X active," "connection to private network Y unavailable," "no service license," or "temporary outage for all Oklahoma-located ATG links."

Still further, various call management infrastructures (e.g., call management and/or features that are operated by a cellular communications service provider 412) may determine and/or provide various states or conditions that may affect providing a feature at a wireless device in a non-terrestrial environment. Examples of such states may include "wireless device eligible for service," "wireless device ineligible for service," "registration for non-terrestrial feature failure," "message delivery success," "message delivery failed," "message delivery failed will retry," and or other suitable states.

Figure 5:
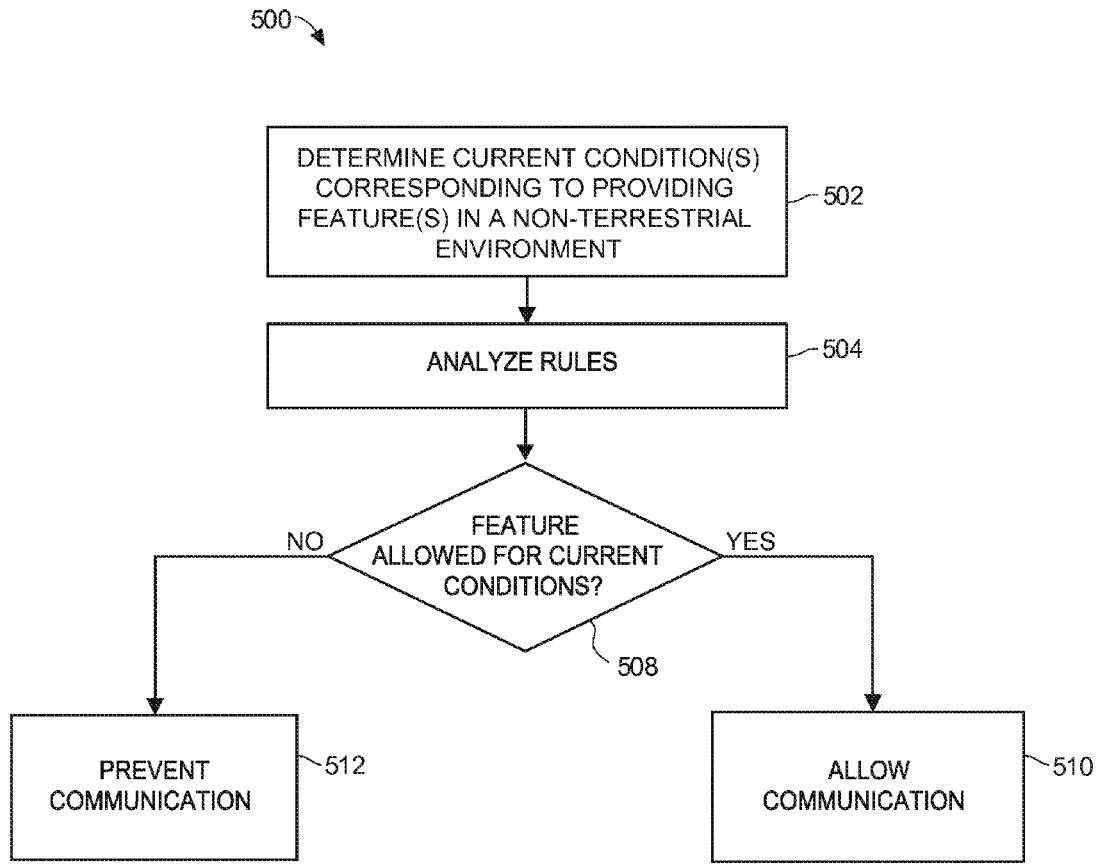
FIG. 5 is an example method for providing feature transparency at wireless devices in a non-terrestrial environment.

FIG. 5 illustrates an example method 500 for providing feature transparency at wireless devices in a non-terrestrial environment. The method 500 may correspond to authorizing communications to provide a terrestrial feature (e.g., a feature which is provided at/to the wireless device in a terrestrial environment) in a non-terrestrial environment. The method 500 may operate in conjunction with any or all portions of the systems, vehicles and/or wireless devices and states corresponding thereto previously discussed with respect to FIGS. 1-4, or the method 500 may operate in conjunction with other suitable systems, vehicles, wireless devices, and/or states. In an embodiment, at least a portion of the method 500 may be performed by an instance of the sentry engine 142. For ease of discussion, the method 500 is discussed below with reference to FIGS. 1-4, however, the discussion below is merely an embodiment and is not limiting.

At a block 502, one or more current conditions or states corresponding to providing a feature in a non-terrestrial environment may be determined, where the presence or absence of the one or more current conditions correspond to authorizing the provision of a feature in the non-terrestrial environment. The feature may be, for example, a terrestrial feature (e.g., a feature which is provided at/to the wireless device 12 in a terrestrial environment) such as sending and/or receiving basic calls, roaming, texting, simultaneous call support, etc. Typically, but not necessarily, the feature requires the wireless device 12 to communicate with its home system 25. The one or more current conditions or states may be dynamic conditions or states such as those previously discussed, e.g., a wireless device state, a flight or vehicle transportation or travel state, a connection state between networks, an activation or registration of the device 12 and/or the feature, or a state that is provided by the home system 25 of the wireless device.

The one or more current conditions may be determined by the wireless device 12, the on-board data distribution device 15, the ground-based node 22, the home system 25 of the wireless device 12, and/or by some suitable other node or computing device. For example, the wireless device 12, the on-board data distribution device 15, the ground-based node 22, the home system 25 of the wireless device 12, and/or some other node (not shown) may detect one or more of the current conditions or states. Additionally or alternatively, the wireless device 12, the on-board data distribution device 15, the ground-based node 22, and/or the home system 25 of the wireless device 12 may receive an indication of one or more of the current conditions or states, e.g., from another computing device. For example, the indication of one or more current conditions or states may be automatically received from another computing device when a state change occurs, periodically, and/or upon request. Upon reception of the indication of the one or more current conditions or states, the receiving device or node may store indication(s) of the one or more current conditions or states.

In an embodiment, at least one of the current conditions may be detected (block 502) by the wireless device 12. For example, a wireless device 12 may detect whether or not the wireless device 12 is in an airplane mode, whether or not a cellular band transceiver of the wireless device 12 is active, and/or whether or the wireless device 12 has been registered and/or authorized to provide the feature in the non-terrestrial environment. In some embodiments, at least one of the current conditions may be determined based on information that is received by and/or stored at the wireless device 12, either a priori or in real-time. For example, a data distribution node 15 may provide current flight states to the wireless device 12, e.g., upon request and/or when the flight state changes, and the wireless device 12 may store a corresponding indication of the most recently received current flight state in its memory. In another example, the wireless device 12 may store information indicative of the wireless device 12 being registered and/or authorized to provide the feature in the non-terrestrial environment, e.g., a network identification of the wireless device (e.g., Media Access Control (MAC) address, Internet Protocol (IP) address, etc.) and/or a user registration (e.g., name, address, credit card information, etc.) corresponding to the feature. A user operating the wireless device 12 may, in some implementations, execute and interact with an application (e.g., a specialty application developed by an airline or service provider) on the wireless device to trigger the sending of conditions to other nodes, e.g., to the node 15 or the node 22. The application to trigger the sending of conditions to other nodes may be the sentry engine 142, in an embodiment.

At block 504, a set of rules (e.g., the set of rules 146) corresponding to providing or permitting the feature in a non-terrestrial environment may be analyzed. For example, the set of rules may indicate that certain communications for certain features may be prohibited in certain flight states, partially allowed in other flight states, and freely allowed in still other flight states. In another example, the set of rules 146 may indicate that communications for all features are temporarily prohibited as the air-to-ground connection quality is temporarily insufficient. Generally, the set of rules 146 may indicate, for a given set of one or more current conditions or states, which communications for which feature(s) are allowed, partially allowed and/or prohibited. These and other criteria may be expressed in the rules 146 as scripts, algorithms, database entries, finite state machines, or any other suitable expression.

In some embodiments, at least a portion of the set of rules 146 may be stored at the wireless device 12. For example, at least a portion of the set of rules 146 may be downloaded or otherwise delivered to the wireless device 12 after the wireless device 12 has been registered or authorized to provide the feature in the non-terrestrial environment. In some embodiments, at least a portion of the rules may be stored at the data distribution node 15 of the vehicle 102, and the data distribution node 15 may communicate rule information to the wireless device 12 as needed. In some embodiments, at least a portion of the rules 146 may be stored at a node 22 of a ground-based system 105a, and the ground-based node 15 may communicate rule information to the wireless device 12 and/or to the data distribution node 15 as needed.

At a block 508, the set of rules that were analyzed (block 504) and the one or more current conditions or states that were determined (block 501) may be compared to determine whether or not the features is allowed, partially allowed or prohibited to be provided in a non-terrestrial environment based on the current conditions or states.

If communications between the wireless device 12 and the home system 25 are determined to be allowed, the method 500 may continue to block 510. In an example scenario, if the user of the wireless device 12 desires to send a text message during a flight state of "above service altitude," the sentry engine 142 may determine (block 508) that the text messaging feature is presently allowed. Accordingly, the text message or feature-specific contents may be caused to be delivered from the wireless device 12 to the home system 25 (block 510), e.g., by using the on-board network 20 (e.g., an on-board Wi-Fi network), the air-to-ground network 105a, a private communications network 105d, and/or a public communications network 105b. In another scenario, the text message or feature-specific contents may be caused to be delivered from the wireless device 12 to the home system (block 510) via the on-board network 20 (e.g., the on-board Wi-Fi network), the satellite communications network 105c, a private communications network 105d, and/or a public communications network 105b. Conversely, if a text message or other data is to be delivered from the home network 25 of the device 12 to the on-board device 12, the forward data may be delivered from the home network 25 via the satellite communications network 105c to the on-board network 20 (e.g., the on-board Wi-Fi network) and the device 12, or the forward data may be delivered from the home network 25 via the ATG network 105a to the on-board network 20 (e.g., the on-board Wi-Fi network) and the device 12.

In another example scenario, the sentry engine 142 may allow administrative communications between the wireless device 12 and the home system 25. For example, the wireless device 12 may update a Visitor Location Register (VLR) at its home system 25, or the wireless device 12 may send billing information to/from its home system 25, such as via the on-board network 20 (e.g., the on-board Wi-Fi network), one of the ATG network 105a or the satellite communications network 105c, and optionally via one or more of public and/or private networks 105b, 105d.

In an embodiment, when the feature is determined as being allowed in the non-terrestrial embodiment (510), an application that is native to the wireless device 12 and that is executed to provide the feature in a terrestrial environment may be executed by the wireless device 12 in the non-terrestrial environment. For example, upon determination of allowance of a texting feature, the sentry engine 142 may cause a native texting application stored at the wireless device 12 to be executed in the non-terrestrial environment. The native texting application may be, for example, the application 144 illustrated in FIG. 3.

If communications between the wireless device 12 and the home system 25 are determined to be prohibited, the method 500 may continue from block 508 to block 512. For example, if the user of the wireless device 12 desires to send a text message during a flight state of "descending," the sentry engine 142 may determine (block 508) that the text messaging feature is presently prohibited, and accordingly, the text message contents may be prevented from being delivered from the vehicle 102. In another example, if the user of the wireless device 12 desires to send a text message during a flight state of "above service altitude" and a current condition is determined (block 502) to be a temporary outage between the ground-based network 105a and the home system 25 of the wireless device 12, instances of the sentry engine 142 at the wireless device 12, the on-board data distribution node 15 and the ground-based system 22 may cooperate to cause the text message contents to be delivered from the wireless device 12 on-board the vehicle 102 to the ground-based network 105a for temporary storage, and the ground-based network 105a may subsequently forward the text message contents to the home system 25 when the temporary outage has ceased (e.g., as determined by a subsequent execution of block 502).

As such, the sentry engine 142 may prevent communications between a native application executed by the wireless device 12 and the home system. In some cases, a message, data, or other communications may be dropped by the wireless device 12, the data distribution node 15 and/or the ground node 22. In some cases, though, even though communications between the wireless device 12 and its home system 25 may be prohibited (block 512), one or more of the nodes 12, 15 and 22 may queue, buffer or cache (or may cause to be queued, buffered, or cached) at least some of the communications for later delivery. In some embodiments, the wireless device 12 may queue, buffer or cache (or may cause to be queued, buffered, or cached) at least some of the communications for later delivery. In some embodiments, the ground-based node 22 may queue, buffer or cache (or may cause to be queued, buffered, or cached) at least some of the communications for later delivery. In some embodiments, the data delivery node 15 may queue, buffer or cache (or may cause to be queued, buffered, or cached) at least some of the communications for later delivery.

In some embodiments, a message, data or other communications may be queued, buffered or cached, and the message or data may be delivered at a later time after a determination has been made that a condition has changed or has been updated (e.g., when a condition is determined at block 502 to exist or cease to exist). In some situations, an indication of the reason for prohibition of a particular feature may be presented at a user interface of the wireless device, e.g., "Feature not available during ascent/descent," or "channel not available, text message queued and will retry." In some embodiments, even though the feature may be prevented, user input corresponding to the feature may still be received at the wireless device, e.g., "Would you like to save the text message for later delivery?"

In an embodiment, an indication of allowed or prevented features at the wireless device 12 in a non-terrestrial environment may be presented at a user interface of the wireless device. For example, a confirmation that text messaging is authorized in a non-terrestrial environment may cause an alert stating "text messaging capabilities activated" to be presented. Further, in some cases, alerts or other notifications may be presented at user interfaces of wireless devices based on the determined conditions. For example, if phone call capabilities are prevented during a current flight state of "below service altitude," an alert may be sent to wireless devices, stating "phone calls are not allowed below service altitude, please try again once service altitude is reached." Moreover, alerts or notifications may be presented at user interfaces of wireless devices when certain features are predicted to be allowed or prevented, such as with alert messages stating "Text/voice capabilities will be available in approximately X minutes."

Figure 6:
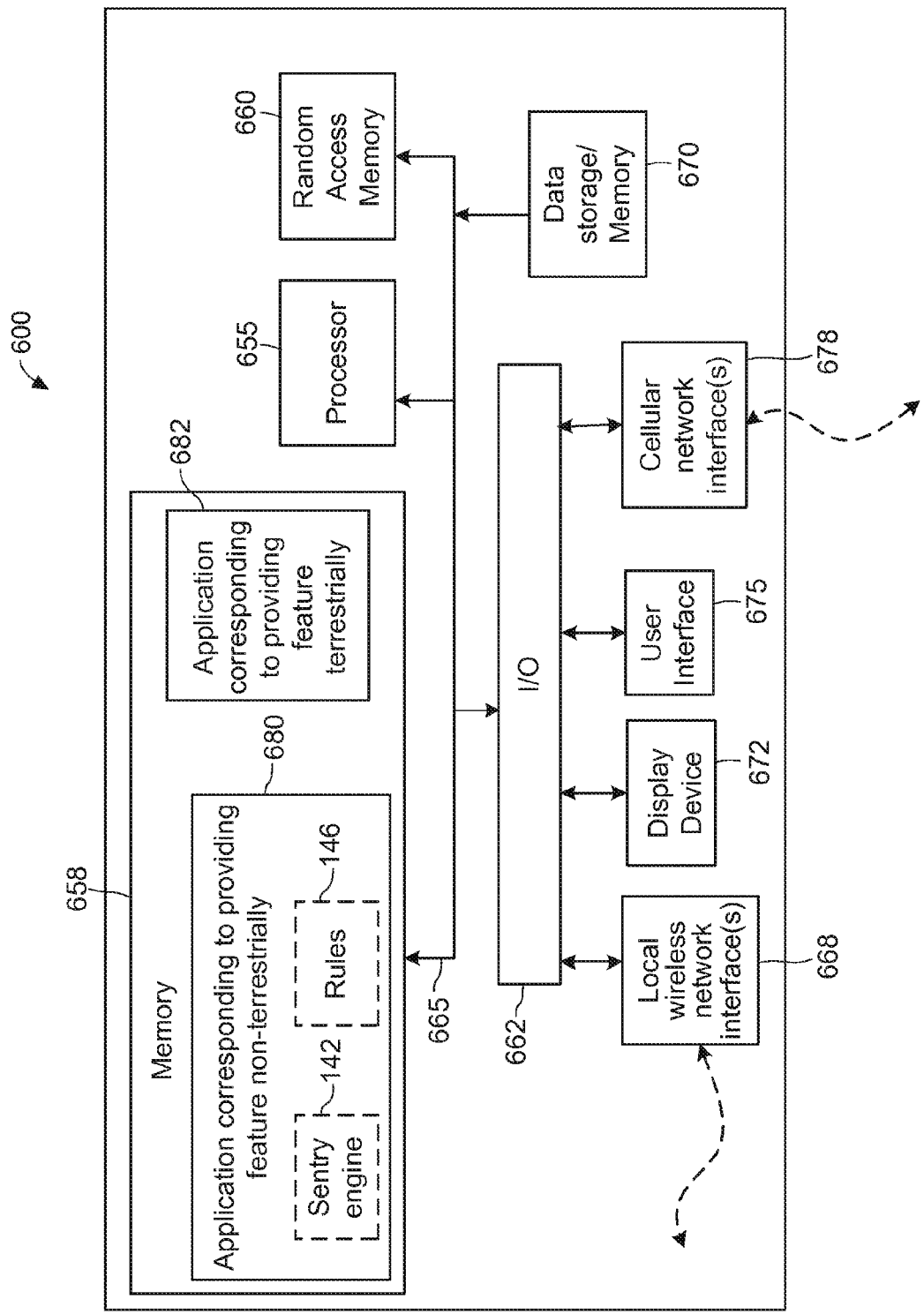
FIG. 6 is a block diagram of an example wireless device at which feature transparency in a non-terrestrial environment may be provided.

FIG. 6 illustrates a block diagram of an example wireless device 600 which may operate in accordance with any of (and/or any one or more portions of) the systems, methods, techniques and concepts discussed herein. The wireless device 600 may be, for example, a smart phone, a smart device, a laptop, a tablet, an electronic reading device, or any other communications or computing device that is configured to communicate wirelessly. In an embodiment, the wireless device 600 may be the wireless device 12a or 12b of FIG. 1b.

The device 600 may include a processor 655 (may be called a controller, microcontroller or a microprocessor, in some embodiments) for executing computer-executable instructions, a program memory 658 for permanently storing data related to the computer-executable instructions, a random-access memory (RAM) or other suitable memory 660 for temporarily storing data related to the computer-executable instructions, and an input/output (I/O) circuit or component 662, all of which may be interconnected via an address/data bus or suitable bus 665. As used herein, the terms "computer-executable instructions," "computer executable instructions," and "instructions" are used interchangeably.

The wireless device 600 may include one or more local wireless interfaces 668 via which the wireless device 600 may wirelessly connect with one or more respective local networks or devices. In an embodiment, the one or more local wireless interfaces 668 enable the wireless device 600 to wirelessly connect to one or more other networks or devices that are included or contained in a non-terrestrial environment, such as on-board an aircraft or boat. For example, the wireless device 600 may communicatively connect to a non-terrestrial, local network (e.g., a non-terrestrial wireless Local Area Network (LAN) hosted on-board a vehicle) using a wireless Ethernet protocol over one of the local interfaces 668. Additionally or alternatively, the wireless device 600 may communicatively connect to a non-terrestrial local wireless network or device using a Near Field Communications (NFC) protocol (e.g., Bluetooth) over one of the local interfaces 668. Generally, the one or more local wireless interfaces 668 may support any radio frequency band other than cellular radio frequency bands, and the one or more local wireless interfaces 668 may include one or more corresponding transceivers. In an embodiment, the local wireless interface 668 communicates with a wireless access point 21, which allows the device 600 to connect to the on-board network 20.

The wireless device 600 may include one or more cellular wireless interfaces 678 to support communications over respective cellular radio frequency (RF) bands, e.g., AMPs, TDMA, CDMA, GSM, PCS, 3G, 4G, 5G, and/or any other terrestrial cellular radio frequency band. For example, the cellular wireless interfaces 678 may communicate with a terrestrial base station or small cell using one or the interfaces 678. Generally, the term "cellular radio frequency band," as used herein, refers to a portion of RF spectrum that is allocated by a governmental agency or other body which governs the usage of spectrum. The one or more cellular radio frequency interfaces 678 may allow the wireless device 600 to communicate over one or more cellular radio frequency bands (e.g., in terrestrial environments), and may include one or more corresponding transceivers. In an embodiment, the one or more cellular interfaces 678 are not used by the wireless device 600 to communicate in non-terrestrial environments, e.g., when the wireless device 600 is on-board the vehicle 102 while the vehicle 102 is in-flight.

In an embodiment, the one or more local interfaces 668 and the one or more cellular network interfaces 678 may each be independently activated and deactivated.

With further regard to FIG. 6, it should be appreciated that although only one processor 655 is shown, the wireless device 600 may include multiple processors 655. Similarly, the memory of the device 600 may include multiple RAMs (Random Access Memories) 660, multiple program memories 658, and/or one or more other data storage entities or types of memories 670. The RAM(s) 660, program memories 658, and/or the data storage entities 670 may be implemented as one or more semiconductor memories, magnetically readable memories, optically readable memories, biological memories, and/or other tangible, non-transitory computer-readable storage media, for example.

Furthermore, although the I/O circuit 662 is shown as a single block, it should be appreciated that the I/O circuit 62 may include a number of different types of I/O circuits or connections. For example, a first I/O circuit may correspond to a display device 672, and the first or a second I/O circuit may correspond to a user interface 675. The user interface 675 may be, for example, a dial, a set of buttons or keypad, a touch screen or touch pad, a voice activation device or devices (e.g., microphone and speaker), or any other known user interface device. In some embodiments, the display device 672 and the user interface 675 may be jointly incorporated in a single or integral physical device. The wireless device 600 may also include other elements common to general purpose computing devices (not shown).

The wireless device 600 may include an application 680 comprising computer-executable electronic instructions 680 for providing a feature at the wireless device 600 in a non-terrestrial environment, generally referred to herein as a "non-terrestrial application 680." In an embodiment, at least a portion of the sentry engine 142 of FIG. 3 is included in the non-terrestrial application 680, e.g., at least a portion of the sentry engine 142 is integral with the non-terrestrial application 680. In an embodiment, the non-terrestrial application 680 includes at least a portion of the set of rules 146 that indicate one or more conditions corresponding to allowing and/or preventing the feature from being provided in a non-terrestrial environment, e.g., at least a portion of the rules 146 is integral with the non-terrestrial application 680.

In an embodiment, if the non-terrestrial application 680 determines that a native, terrestrial feature is allowed to be provided in the non-terrestrial environment, another application 682 that is executed when the wireless device provides the feature in a terrestrial environment (generally referred to herein as a "terrestrial application 682") may be allowed to be at least partially executed. In an embodiment, the terrestrial application 682 may be the application 144 of FIG. 3. As such, the non-terrestrial application 680 may serve as a gatekeeper or sentry for the execution of the terrestrial application 682. Accordingly, if one or more conditions change so that the feature may no longer be provided in the non-terrestrial environment, the non-terrestrial environment application 680 may cause the terrestrial application 682 to cease execution. In some embodiments, the non-terrestrial application 680 and the terrestrial application 682 are an integral application, and in some embodiments, the non-terrestrial application 680 and the terrestrial application 682 are distinct applications that may be separately delivered to the wireless device 600.

In some embodiments, the computer-executable instructions 680 for the non-terrestrial application may be configured to cause the wireless device 600 to perform one or more portions of one or more of the methods described herein. The instructions 680 may be stored on a tangible, non-transitory computer-readable storage medium, such as on the memory 658 or on some other suitable memory. Furthermore, the instructions 680 may be executable by one or more processors 655. The instructions 680 may be downloaded or otherwise delivered to the wireless device 600, for example, after the wireless device 600 has been authorized or registered to provide the feature in the non-terrestrial environment. In an embodiment, the instructions 680 may be downloaded or delivered based on a user request.

Figure 7:
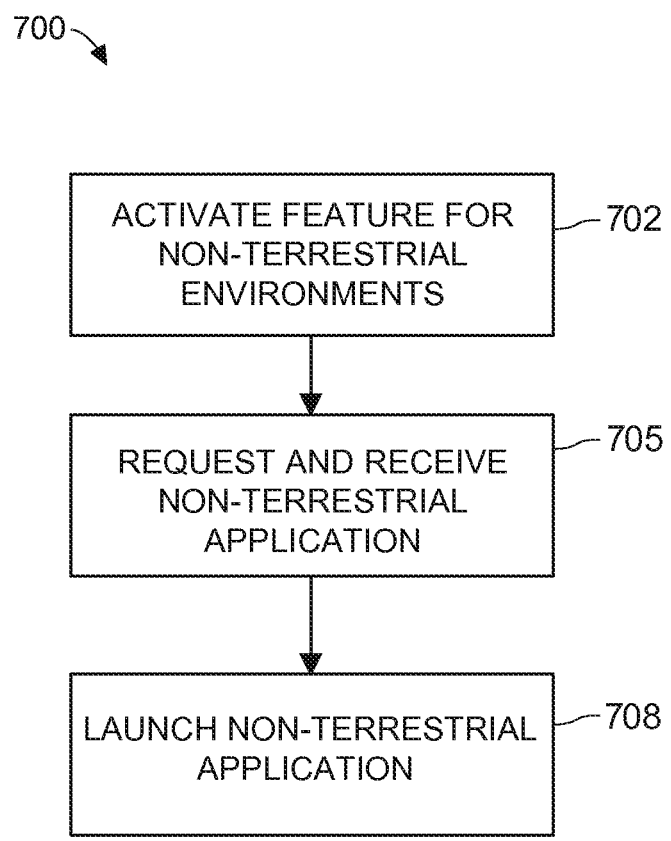
FIG. 7 is a flow diagram illustrating an example method for providing a native, terrestrial feature at a user's wireless device in a non-terrestrial environment.

FIG. 7 illustrates example of a method 700 for causing a native, terrestrial feature to be provided at a user's wireless device in a non-terrestrial environment. The method 700 includes a user interface flow which may be presented, for example, at a user interface 675 or display device 672 of the wireless device 600, or at the user interface of any other suitable wireless device. The sample user interface flow 700 may be presented in conjunction with any of the methods, systems, devices, techniques and concepts described herein and/or with other methods, systems, devices, techniques and concepts, although the method 700 is discussed below with respect to FIGS. 1-6 for ease of discussion only.

At a block 702, a user causes the terrestrial feature to be activated for non-terrestrial environments. For example, the user may request that the feature be activated for non-terrestrial environments while the user is located in a terrestrial environment, e.g., via a web-browser or "get feature" user control at his or her wireless device, or at another computing device. The user request may result in a set of user interface screens (or similar) to receive the user's identification, account number, login/password, payment for service, wireless device identification information, billing address, and/or other administrative information associated with the user. Via these screens, the user and/or his or her wireless device may register and receive authorization to provide the service at his or her wireless device in non-terrestrial environments, in an embodiment.

At a block 705, the user may request and receive at his or her wireless device the non-terrestrial application 680 corresponding to providing the native feature in non-terrestrial environments. In one scenario, the user requests and receives the non-terrestrial application 680 as a download while the wireless device 600 is connected to a terrestrial network in a terrestrial environment, e.g., via a terrestrial cellular communications carrier using the cellular band frequency interface 678, or via a terrestrial local area network (e.g., terrestrial Wi-Fi or wired local area network) using the local wireless network interface 668. Subsequently, the user may cause the application 680 to be executed when his or her wireless device 600 is in a non-terrestrial environment.

Note, however, that the block 702 and/or the block 705 may be performed by the user in a non-terrestrial environment. For example, a user may be in-flight, may connect his or her wireless device 600 to an available non-terrestrial network on-board the aircraft (e.g., the on-board network 20), and may utilize his or her wireless device 600 to access a portal of an in-flight communications carrier that is provided via the non-terrestrial network. In this example scenario, the user may request activation of the feature (block 702) via the portal. Similarly, the user may receive, via the portal provided by the in-flight communications carrier, the non-terrestrial application 680 corresponding to providing the native feature in the non-terrestrial environment, for example, after the user has entered a request at the portal for the application 680 to be delivered.

After the application 680 has been loaded onto (or otherwise delivered and installed) the user's wireless device 600, the user may launch the application 680, e.g., by selecting a respective icon or entering a user interface command.

In some embodiments, different features may each require a respective application 680 to be delivered to the user's wireless device. In some embodiments, a single application 680 may correspond to providing more than one feature in the non-terrestrial environment. In some embodiments, the application 680 may be integral with the portal provided by an in-flight communications carrier.

Figure 8:
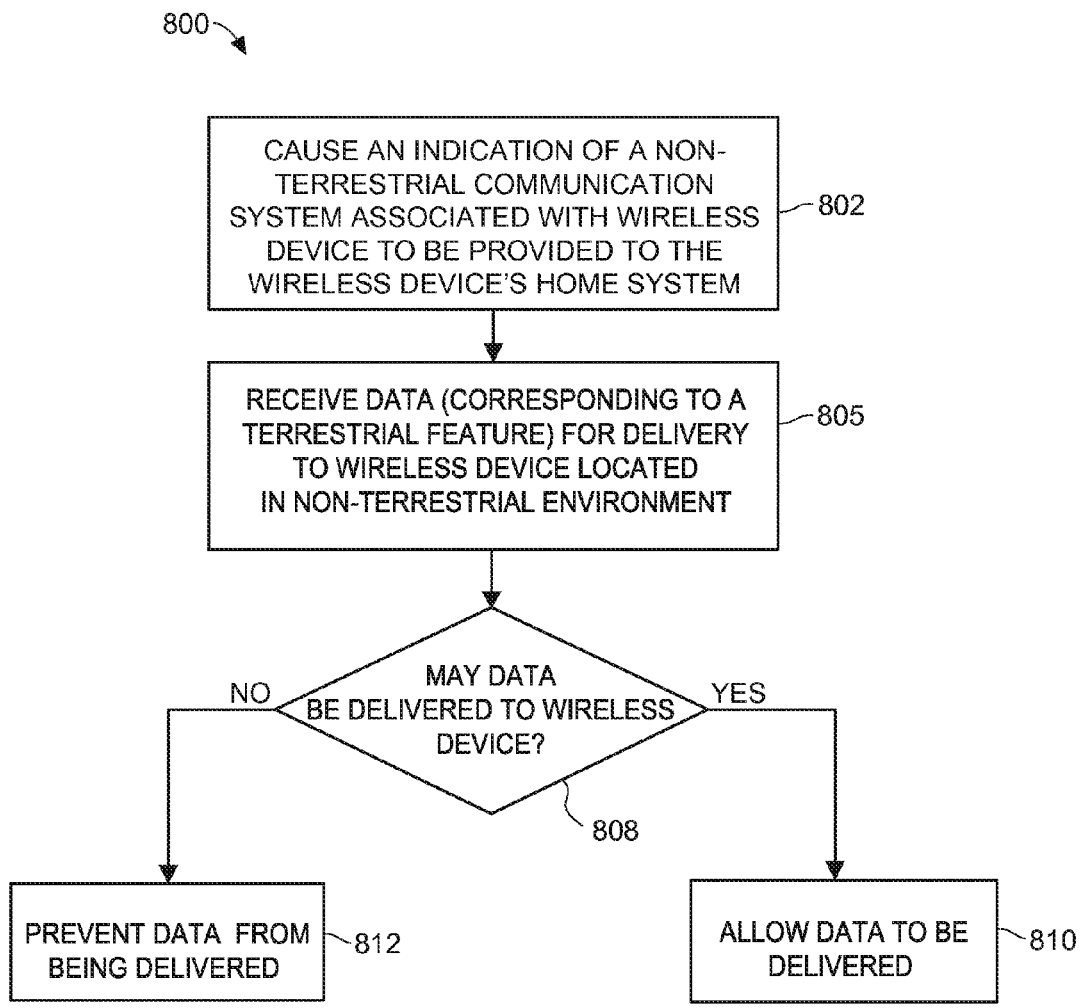
FIG. 8 is a flow diagram illustrating an example method for providing a native, terrestrial feature at a user's wireless device in a non-terrestrial environment.

FIG. 8 illustrates an example of a method 800 for providing a native, terrestrial feature at a user's wireless device in a non-terrestrial environment. The method may be performed in conjunction with any of the methods, systems, devices, techniques and concepts described herein and/or with other methods, systems, devices, techniques and concepts, although for ease of discussion only, the method 800 is discussed below with respect to FIGS. 1-7.

At a block 802, the method 800 may cause an indication of a non-terrestrial communication service system that is associated with the wireless device to be provided to a home system of the wireless device. For example, when a wireless device 12 is being serviced by the on-board network 20 or other network provided by a non-terrestrial communications service provider, an indication of the non-terrestrial communications service provider or a system operated by the non-terrestrial communications service provider to which the wireless device 12 is connected may be provided to the home network 25 of the wireless device 12.

At a block 805, the method 800 may include receiving data or information to be delivered to the wireless device 12, where the data or information corresponds to a native feature that is provided or supported by the home communication service provider or system of wireless device 12, and where the wireless device 12 is currently located in a non-terrestrial environment, e.g., in the cabin of an aircraft or on-board a sailing ship. In some scenarios, at least some of the content of the data or information is originated by the home system 25 of the wireless device 12. The content of the data or information may include, for example, feature content data and/or feature administration data.

At a block 808, a determination is made as to whether or not the received data may be delivered to the wireless device 12, e.g., if the native feature is currently allowed (at least partially) at the non-terrestrially located wireless device 12. The determination may be made, for example, based on a set of rules corresponding to providing the native feature at the wireless device 12 in a non-terrestrial environment (e.g., the set of rules 146). Additionally or alternatively, the determination may be made based on a set of current conditions or states corresponding to the wireless device 12, the feature, and/or any intervening networks or components required to support communications between the wireless device 12 and its home system 25.

If the data corresponding to the native feature may be delivered to the wireless device 12 in the non-terrestrial environment, e.g., the data may be so delivered using any intermediate networks (block 810). If the data corresponding to the native feature may not currently be delivered to the wireless device 12 in the non-terrestrial environment, the data may be prevented from being delivered (block 812) (e.g., the data may be dropped or queued). In an embodiment, the home network 25 may be notified of the prevention and/or of the reason for prevention of the data delivery. In an embodiment, if a particular condition changes so that data delivery is allowed, the method 800 may cause any queued data or newly received data to be delivered to the wireless device 12.

In an embodiment, the method 800 may additionally or alternatively include (not shown) causing data or information corresponding to the native feature to be delivered from the wireless device 12 to its home network 25. For example, the delivery of data or information corresponding to the native feature may be delivered from the wireless device 12 to its home network 25 based on the set of rules corresponding to providing the native feature at the wireless device 12 in a non-terrestrial environment (e.g., the set of rules 146) and on a current set of conditions or states corresponding to the wireless device 12 and/or corresponding to any intervening networks or components required to support communications between the wireless device 12 and its home system 25.

In an embodiment, the method 800 may additionally or alternatively include (not shown) causing an application (e.g., the terrestrial application 680) to be downloaded or otherwise delivered to the wireless device 12. In an embodiment, the method 800 may additionally or alternatively include receiving a registration or a request to enable the native feature at the wireless device 12.

Of course, the applications and benefits of the systems, methods and techniques described herein are not limited to only the above examples. Many other applications and benefits are possible by using the systems, methods and techniques described herein.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A system for providing feature transparency at wireless devices, comprising:
    an interface configured to provide a communicative connection to a network, the network being configured to service a wireless device disposed in a non-terrestrial environment; and
    a sentry engine communicatively connected to the interface and configured to:
        receive an indication of one or more conditions corresponding to the wireless device providing a feature in the non-terrestrial environment, the non-terrestrial environment excluding any cells operating in a terrestrial cellular frequency band; and
        based on the indication of the one or more conditions and on a first portion of a set of rules corresponding to the wireless device providing the feature in the non-terrestrial environment, one of:
            prevent communications between (i) an application executing on the wireless device, the application corresponding to providing the feature in the non-terrestrial environment, and (ii) a home system to which the wireless device is homed, or
            allow communications between the home system and the application,
        wherein the first portion of the set of rules corresponding to the wireless device providing the feature in the non-terrestrial environment is different than a second portion of the set of rules corresponding to the wireless device providing another feature in the non-terrestrial environment.

2. The system of claim 1, wherein:
    the non-terrestrial environment includes a non-terrestrial network communicatively connected to a ground-based network, the non-terrestrial network comprising:
        a first portion including at least a portion of a wireless, local area network contained within a vehicle; and
        a second portion including at least one of:
            (a) an air-to-ground (ATG) network configured to deliver communications directly between the vehicle and a first ground station, or
            (b) a satellite communications network configured to deliver communications directly between the vehicle and a satellite, and between the satellite and a second ground station;
    the first ground station and the second ground station are communicatively connected to the ground-based network;
    the ground-based network is communicatively connected to the home system of the wireless device; and
    the network configured to service the wireless device is the wireless, local area network.

3. The system of claim 2, wherein at least one of:
    (a) at least a first portion of the sentry engine is stored at the wireless device;
    (b) at least a second portion of the sentry engine is included in the application executing on the wireless device;
    (c) at least a third portion of the sentry engine is stored at the non-terrestrial network;
    (d) at least a fourth portion of the sentry engine is stored at the ground-based network;
    (e) a first portion of the interface is included in the wireless device;
    (f) a second portion of the interface is included in the ground-based network; or
    (g) at least a part of the first portion of the set of rules is included in the application executing on the wireless device.

4. The system of claim 1, wherein the feature includes at least one of:
    a roaming capability for the wireless device,
    a texting capability for the wireless device, or
    a simultaneous call capability for the wireless device.

5. The system of claim 1, wherein the one or more conditions corresponding to the wireless device providing the feature in the non-terrestrial environment include at least one of:
    an operational state of the wireless device,
    a flight state of a vehicle in which the non-terrestrial environment is included and on which the wireless device is being transported,
    a connection state of a non-terrestrial network included in the non-terrestrial environment and a ground-based network,
    a roaming state of the wireless device,
    a state of the feature corresponding to the wireless device, or
    an authorization of the wireless device to provide the feature in the non-terrestrial environment.

6. The system of claim 1, wherein the sentry engine is further configured to at least one of:

prevent communications between the application and the home system while allowing input corresponding to the feature and/or allowing output corresponding to the feature at a user interface of the wireless device; or prevent or allow communications between the application and the home system based on a change to the one or more conditions.

7. The system of claim 1, wherein the application executing on the wireless device and corresponding to providing the feature in the non-terrestrial environment is a first application, and the first application is:

integral with an application executing on the wireless device and corresponding to providing the feature in a terrestrial environment; or distinct from the application executing on the wireless device and corresponding to providing the feature in the terrestrial environment, and wherein the first application is downloaded to the wireless device upon authorization of the wireless device to provide the feature in the non-terrestrial environment.

8. A method of providing feature transparency at wireless devices, comprising:

providing, to a home system in which a wireless device is homed, an indication of a non-terrestrial communications service system corresponding to the wireless device, wherein:

the non-terrestrial communications service system includes a non-terrestrial wireless network and a ground-based network in communicative connection, the ground-based network is communicatively connected to the home system of the wireless device, and the non-terrestrial wireless network and the home system of the wireless device each use a different wireless frequency band to directly communicate with the wireless device;

receiving, at the non-terrestrial communications service system, first data to be delivered to the wireless device and corresponding to a first feature provided at the wireless device in a terrestrial environment;

causing the first data to be delivered via the non-terrestrial communications service system to the wireless device while the wireless device is disposed in a non-terrestrial environment, the first data delivery based on (i) a first portion of a set of rules corresponding to conditions that correspond to providing the first feature in the non-terrestrial environment, and (ii) a set of current conditions; and causing second data corresponding to a second feature provided at the wireless device in the terrestrial environment to be delivered via the non-terrestrial communications service system to the wireless device while the wireless device is disposed in the non-terrestrial environment, the second data delivery based on (i) a second portion of the set of rules corresponding to conditions that correspond to providing the second feature in the non-terrestrial environment, and (ii) the set of current conditions.

9. The method of claim 8, wherein causing the first data to be delivered to the wireless device based on the set of current conditions comprises causing the first data to be delivered to the wireless device based on at least one of:

an operational state of the wireless device, a flight state of a vehicle disposed in the non-terrestrial environment, wherein the wireless device is on-board the vehicle, a connection state of the non-terrestrial wireless network and the ground-based network, a roaming state of the wireless device, a state of the first feature corresponding to the wireless device, or an authorization of the wireless device to provide the first feature in the non-terrestrial environment; and wherein causing the first data to be delivered to the wireless device based on the set of current conditions comprises at least one of:

preventing the first data from being delivered to the wireless device when the set of current conditions includes at least one particular condition;

allowing the first data to be delivered to the wireless device when the set of one or more conditions excludes the at least one particular condition; and buffering the first data while the at least one particular condition exists and causing the buffered data to be delivered to the wireless device when the at least one particular condition ceases to exist.

10. The method of claim 8, wherein receiving the first data corresponding to the first feature comprises receiving data corresponding to at least one of a call delivery feature, a roaming feature, a texting feature, or a simultaneous call feature.

11. The method of claim 8, wherein:

the first data is data that is caused to be delivered to the wireless device based on the first portion of the set of rules; and the method further comprises causing additional data to be delivered via the non-terrestrial communications service system from the wireless device to the home system based on a third second portion of the set of rules.

12. The method of claim 8, further comprising causing an application corresponding to providing the first feature in the non-terrestrial environment to be delivered to the wireless device.

13. The method of claim 8, further comprising receiving a registration of the wireless device corresponding to the wireless device providing the first feature in the non-terrestrial environment.

14. The method of claim 8, wherein:

a portion of the non-terrestrial wireless network contained within the vehicle uses a local area network protocol to directly communicate with the wireless device; and at least one of:

at least a first portion of the non-terrestrial wireless network external to the vehicle uses a satellite communications protocol to communicate between the vehicle and a satellite that is communicatively connected to the ground-based network; or at least a second portion of the non-terrestrial wireless network external to the vehicle uses an air-to-ground communications protocol to directly communicate between the vehicle and a ground station communicatively connected to the ground-based network.

15. A method of providing feature transparency at wireless devices, comprising:

determining, by a wireless device being transported by a vehicle in a non-terrestrial environment, one or more conditions corresponding to the wireless device providing, in the non-terrestrial environment, a first feature that is provided by the wireless device in a terrestrial environment, the non-terrestrial environment including a non-terrestrial network communicatively connected with a ground-based system, the ground-based system in communicative connection with a home system to which the wireless device is homed, the non-terrestrial network configured to use a first wireless protocol to directly communicate with the wireless device, and the home system configured to use a second wireless protocol different from the first wireless protocol to directly communicate with the wireless device in the terrestrial environment;

based on the one or more conditions and on a first set of rules corresponding to providing the first feature in the non-terrestrial environment, one of:

preventing communications between (i) an application executed by the wireless device and corresponding to providing the first feature in the non-terrestrial environment and (ii) the home system of the wireless device, or allowing communications between the application and the home system; and based on the one or more conditions and on a second set of rules corresponding to providing a second feature in the non-terrestrial environment, one of:

preventing communications corresponding to providing the second feature in the non-terrestrial environment between the wireless device and the home system, or allowing communications corresponding to providing the second feature in the non-terrestrial environment between the wireless device and the home system.

16. The method of claim 15, wherein determining the one or more conditions comprises determining at least one of:

an operational state of the wireless device, an indication of an authorization of the wireless device to provide the first feature in the non-terrestrial environment, a flight state of a vehicle disposed in the non-terrestrial environment and on which the wireless device is being transported, a connection state of the non-terrestrial network with the ground-based network, a roaming state of the wireless device, or a state of the first feature corresponding to the wireless device.

17. The method of claim 15, further comprising receiving and storing, at the wireless device, at least a portion of the first set of rules corresponding to providing the first feature in the non-terrestrial environment.

18. The method of claim 15, further comprising receiving an update to the one or more conditions, and at least one of:

preventing communications between the application and the home system based on the updated one or more conditions, or allowing communications between the application and the home system based on the updated one or more conditions.

19. The method of claim 15, further comprising:

buffering data that has been prevented from being delivered between the application executed by the wireless data device and the home system of the wireless device; and causing the buffered data to be communicated between the application and the home system when a change to the one or more conditions is detected.

20. The method of claim 15, wherein at least one of:

the first wireless protocol is a local area network wireless protocol, and a first portion of the non-terrestrial network contained within the vehicle uses the local area network wireless protocol to directly communicate data to and from the wireless device;

a second portion of the non-terrestrial network external to the vehicle uses a satellite communications protocol to communicate data between the vehicle and a satellite that is communicatively connected to the ground-based system; or a third portion of the non-terrestrial network external to the vehicle uses an air-to-ground communications protocol to directly communicate data between the vehicle and a ground station communicatively connected to the ground-based system.

* * * * *